United States Patent
Toukairin

(10) Patent No.: US 9,169,761 B2
(45) Date of Patent: Oct. 27, 2015

(54) UREA-WATER ADDITION CONTROL UNIT

(71) Applicant: DENSO CORPORATION, Kariya, Aichi-pref. (JP)

(72) Inventor: Masakazu Toukairin, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/098,815

(22) Filed: Dec. 6, 2013

(65) Prior Publication Data
US 2014/0182274 A1  Jul. 3, 2014

(30) Foreign Application Priority Data
Dec. 28, 2012 (JP) .................... 2012-287439

(51) Int. Cl.
*F01N 3/00* (2006.01)
*F01N 3/20* (2006.01)
*F01N 9/00* (2006.01)

(52) U.S. Cl.
CPC *F01N 3/208* (2013.01); *F01N 9/00* (2013.01); *F01N 2610/02* (2013.01); *F01N 2900/0418* (2013.01); *F01N 2900/1821* (2013.01); *Y02T 10/47* (2013.01)

(58) Field of Classification Search
CPC .................. F01N 3/2013; F01N 3/20
USPC ............................................ 60/287
See application file for complete search history.

(56) References Cited

U.S. PATENT DOCUMENTS

| 5,321,633 | A | * | 6/1994 | Kataoka et al. | 702/100 |
|---|---|---|---|---|---|
| 2007/0266703 | A1 | | 11/2007 | Hirata et al. | |
| 2008/0178575 | A1 | * | 7/2008 | Shaikh et al. | 60/274 |
| 2008/0276598 | A1 | * | 11/2008 | Gresens | 60/286 |
| 2009/0056315 | A1 | * | 3/2009 | Solbrig et al. | 60/286 |
| 2009/0293452 | A1 | * | 12/2009 | Tarabulski | 60/276 |
| 2010/0086446 | A1 | | 4/2010 | Matsunaga et al. | |
| 2010/0205940 | A1 | * | 8/2010 | Toshioka et al. | 60/276 |
| 2011/0099985 | A1 | * | 5/2011 | Yasui et al. | 60/287 |

FOREIGN PATENT DOCUMENTS

| JP | 2003-269142 A | 9/2003 |
|---|---|---|
| JP | 2005-264731 A | 9/2005 |
| JP | 2009-197710 A | 9/2009 |

OTHER PUBLICATIONS

Office Action mailed Dec. 9, 2014 issued in corresponding JP patent application No. 2012-287439 (and English translation).

* cited by examiner

*Primary Examiner* — Jason Shanske
(74) *Attorney, Agent, or Firm* — Posz Law Group, PLC

(57) ABSTRACT

A control portion sets a total injection amount of a urea water injected from an injector to an exhaust gas, and controls to open or close the injector based on the injection amount. An injection-amount correcting portion estimates an injection characteristic of the injector from an injection-amount difference between the total injection amount and a decreased amount of the urea water in a tank, and corrects a command value of a control signal outputted to the injector based on the injection characteristic. Therefore, the injection amount is corrected by considering the individual differences or the age-related deterioration.

5 Claims, 7 Drawing Sheets

UREA-WATER ADDITION CONTROL UNIT

CROSS-REFERENCE TO RELATED APPLICATION

This application is based on Japanese Patent Application No. 2012-287439 filed on Dec. 28, 2012, the disclosure of which is incorporated herein by reference.

TECHNICAL FIELD

The present disclosure relates to a urea-water addition control unit which adds a urea water to an exhaust gas of an internal combustion engine, in order to purify the exhaust gas.

BACKGROUND

Conventionally, it is well known that a urea selective catalytic reduction system (urea SCR system) uses a urea to purify an exhaust gas of an internal combustion engine as a post operation. JP-2003-269142A discloses that a nitrogen oxide (NOx) included in an exhaust gas is reduced by adding the urea to the exhaust gas in the urea SCR system. In this case, the urea is mixed with water as a urea water and is injected to the exhaust gas. A urea-water injector is controlled to be open or closed according to an injection control portion. The injection control portion controls an injection amount of the urea water added to the exhaust gas, according to an amount of the NOx in the exhaust gas or an operation state of the internal combustion engine. According to JP-2003-269142A, the injection control portion detects the amount of the NOx included in the exhaust gas flowing through an exhaust passage, computes the injection amount of the urea water suitable for the amount of the NOx, and controls the urea-water injector.

However, the urea-water injector may cause variation in the injection amount of the urea water with respect to a command value from the injection control portion, due to individual differences or an age-related deterioration. When the variation in the injection amount of the urea water added to the exhaust gas is generated, a reduction of the NOx included in the exhaust gas is insufficient, and ammonia may be generated due to the urea water insufficient in the exhaust gas.

SUMMARY

It is an object of the present disclosure to provide a urea-water addition control unit by which an injection amount of a urea water added to an exhaust gas is accurately controlled without a complicated procedure.

According to an aspect of the present disclosure, the urea-water addition control unit includes an injection-amount correcting portion which estimates an injection characteristic of an injector from a difference between a sum of injection amounts and a decreased amount of a urea water computed from a amount of the urea water, and corrects the injection amount based on the injection characteristic. In an ideal condition, the sum of injection amounts is equal to the decreased amount of the urea water. However, the difference is generated between the sum and the decreased amount, due to individual differences or an age-related deterioration of the injector. In this case, the injection-amount correcting portion estimates the injection characteristic corresponding to the difference, and corrects the injection amount based on the injection characteristic. Further, the injection-amount correcting portion acquires the injection characteristic at an optional time. Therefore, the injection characteristic due to the individual differences or the age-related deterioration is not necessary to be acquired before the injector is mounted to a urea-water addition device, and a manufacturing process for mounting the injector can be simplified. Thus, an accuracy of the injection amount of the urea water added to the exhaust gas can be improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
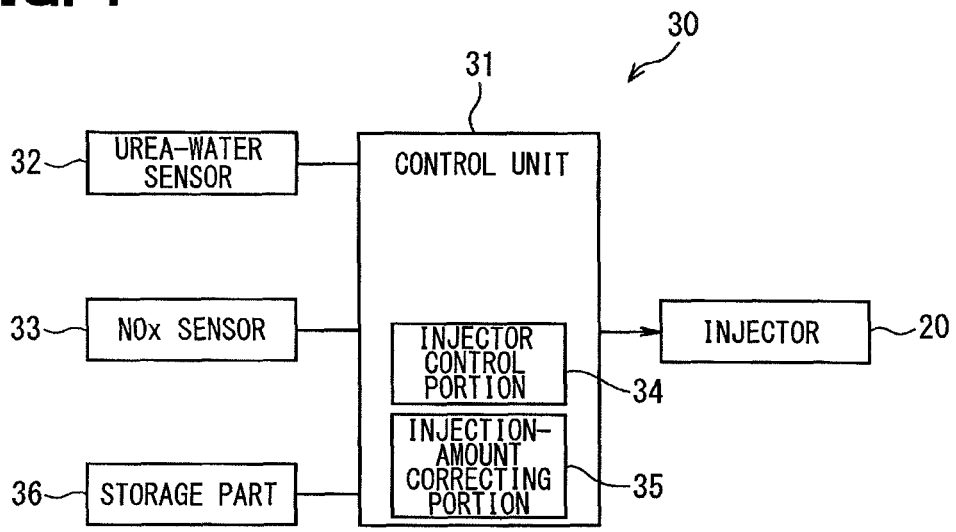
FIG. 1 is a block diagram showing a urea-water addition device using a urea-water addition control unit according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, referring to drawings, an exhaust purifying system using a urea-water addition control unit will be described according to embodiments. In addition, the substantially same parts and the components as embodiments are indicated with the same reference numeral and the same description will not be reiterated.

First Embodiment

Figure 2:
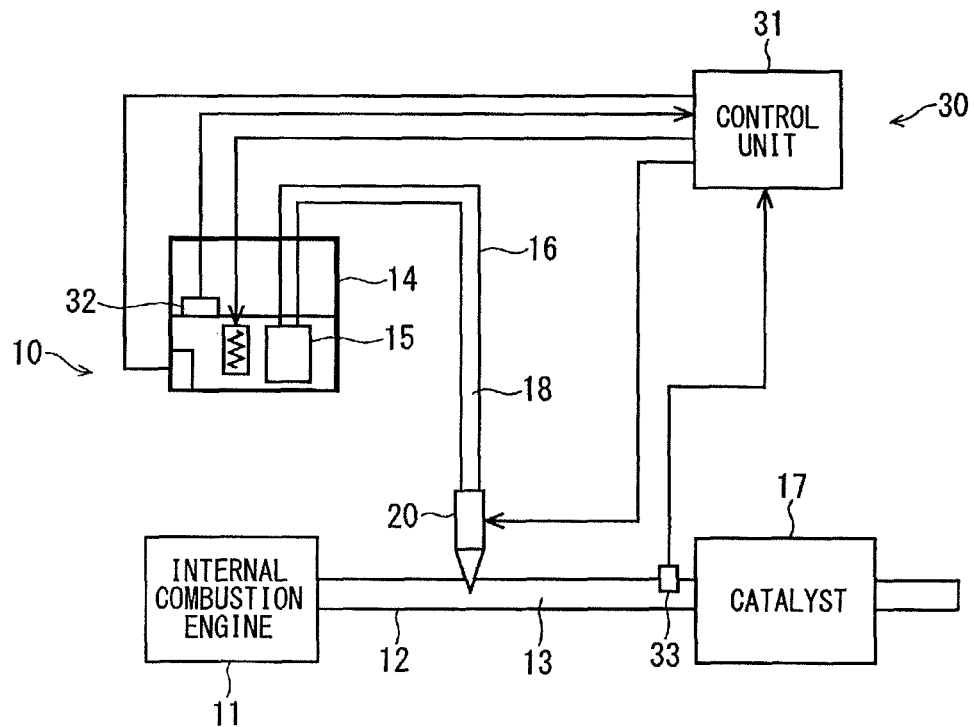
FIG. 2 is a schematic diagram showing an exhaust purifying system using the urea-water addition control unit, according to the first embodiment.

According to a first embodiment, as shown in FIG. 2, the exhaust purifying system 10 is constructed by a selective catalytic reduction system (SCR system) in which a urea water is added to an exhaust gas discharged by an internal combustion engine 11 mounted to a vehicle, to reduce a nitrogen oxide (NOx) included in the exhaust gas. The exhaust gas is discharged to atmosphere via an exhaust passage 13 defined by an exhaust pipe member 12. The internal combustion engine 11 may be a diesel engine. In addition, the exhaust purifying system 10 is not limited to the diesel engine. For example, the exhaust purifying system 10 may be used for a gasoline engine or a gas-turbine engine. Further, the exhaust purifying system 10 is not limited to the internal combustion engine 11 mounted to the vehicle. For example, the exhaust purifying system 10 may be used for an internal combustion engine of a stationary, such as a power generating unit.

The exhaust purifying system 10 includes a tank 14, a pump 15, a pipe part 16, and a catalyst 17. The tank 14 stores an aqueous solution of a urea. The pump 15 is accommodated in the tank 14. The pipe part 16 defines a urea-water passage 18. The catalyst 17 is provided in the exhaust passage 13 to promote a decomposition of the NOx included in the exhaust gas, The exhaust purifying system 10 further includes an injector 20 as a urea-water injector. The pipe part 16 has a first end part connected with the injector 20 opposite to a second end part connected with the pump 15. The urea water discharged from the pump 15 is supplied to the injector 20 via the urea-water passage 18. The injector 20 is arranged at the exhaust pipe member 12. The injector 20 penetrates through the exhaust pipe member 12 to expose a tip end to the exhaust passage 13. The urea water supplied to the injector 20 is injected to the exhaust gas flowing through the exhaust passage 13. The exhaust gas discharged from the internal combustion engine 11 and the urea water injected from the injector 20 are mixed in the exhaust passage 13 and flows into the catalyst 17. The NOx included in the exhaust gas is reduced by a reaction between the catalyst 17 and the urea included in the urea water.

A urea-water addition device 30 includes the injector 20, the tank 14, and a urea-water sensor 32. The urea-water sensor 32 corresponding to a detecting portion detects an amount of the urea-water. A control unit 31 corresponding to a urea-water addition control unit is constructed by a microcomputer having a CPU, a ROM, and a RAM. The control unit 31 controls the urea-water addition device 30 according to a program stored in the ROM. The control unit 31 is connected with the urea-water sensor 32 and a NOx sensor 33. As shown in FIG. 1, the control unit 31 achieves an injector control portion 34 and an injection-amount correcting portion 35 as software by executing the program. In addition, the injector control portion 34 and the injection-amount correcting portion 35 may be configured by software or a combination of software and hardware. The injector control portion 34 corresponds to a control portion, and the injection-amount correcting portion 35 corresponds to a correcting portion.

The urea-water sensor 32 is provided in the tank 14. The urea-water sensor 32 detects the amount of the urea water accommodated in the tank 14. Specifically, the urea-water sensor 32 detects a liquid level of the urea water in the tank 14. In addition, the urea-water sensor 32 may detect the amount of the urea water based on a cubic volume or a weight of the urea water in the tank 14. The urea-water sensor 32 outputs the amount of the urea water as an electrical signal to the control unit 31. The NOx sensor 33 is provided in the exhaust passage 13 between the internal combustion engine 11 and the catalyst 17. The NOx sensor 33 detects an amount of the NOx included in the exhaust gas flowing through the exhaust passage 13. In addition, the NOx sensor 33 may be configured to detect a concentration of the NOx included in the exhaust gas. The NOx sensor 33 outputs the amount of the NOx as an electrical signal to the control unit 31. The NOx sensor 33 is connected with a storage part 36. The storage part 36 may be constructed by a non-volatile memory. The storage part 36 stores data acquired by various sensors. The storage part 36 may be shared with the ROM or RAM of the control unit 31.

The injector control portion 34 sets an injection amount of the urea water injected to the exhaust gas. Specifically, the injector control portion 34 sets the injection amount based on the amount of the NOx included in the exhaust gas. Further, the injector control portion 34 controls a urea-water injection of the injector 20 based on the injection amount. Specifically, the injector control portion 34 controls to open or close the injector 20 based on the injection amount. The injector 20 electromagnetically intermits the urea-water injection. Therefore, the injector control portion 34 adjusts an injection time period of the urea water or the injection amount per unit time, by changing a command value of a control signal outputted to the injector 20, so as to control the injection amount. Thus, the injector 20 injects the urea water to the exhaust gas at an amount set by the injector control portion 34.

The injection-amount correcting portion 35 corrects the injection amount based on an injection characteristic of the injector 20. Specifically, the injection-amount correcting portion 35 corrects the command value of the control signal outputted from the injector control portion 34 to the injector 20. The injector 20 intermits the urea-water injection according to the control signal. For example, when the injection amount of the injector 20 per unit time is constant, the command value corresponds to the injection time period. In this case, the injection-amount correcting portion 35 corrects the injection amount by extending or shortening the injection time period based on the command value. Alternatively, when the injection amount of the injector 20 per unit time is changeable according to an opening degree of an injection port of the injector 20, the command value corresponds to the opening degree. In this case, the injection-amount correcting portion 35 corrects the injection amount by changing the opening degree based on the command value. Thus, the injection-amount correcting portion 35 corrects the injection time period or the opening degree according to a type of the injector 20 to correct the injection amount.

The injection-amount correcting portion 35 acquires a total injection amount Ct corresponding to a sum of the injection amounts set by the injector control portion 34 during a predetermined time period. The injector 20 injects the urea water according to the command value. The injection-amount correcting portion 35 acquires the total injection amount Ct based on the command value. Further, the injection-amount correcting portion 35 acquires a decreased amount Ld corresponding to a decreased amount of the urea water in the tank 14 detected by the urea-water sensor 32. The injection-amount correcting portion 35 estimates the injection characteristic of the injector 20 based on a difference between the total injection amount Ct and the decreased amount Ld. The injection-amount correcting portion 35 corrects the injection amount based on the injection characteristic.

Figure 3:
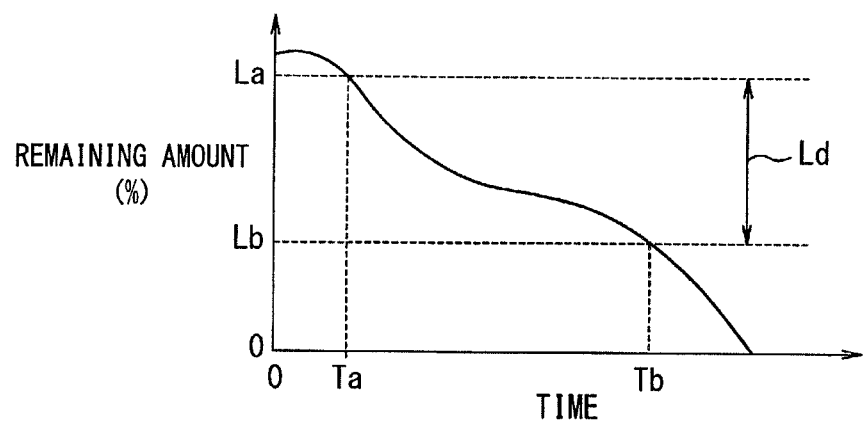
FIG. 3 is a graph showing a relationship between a remaining amount of a urea water in a tank and time.
Figure 4:
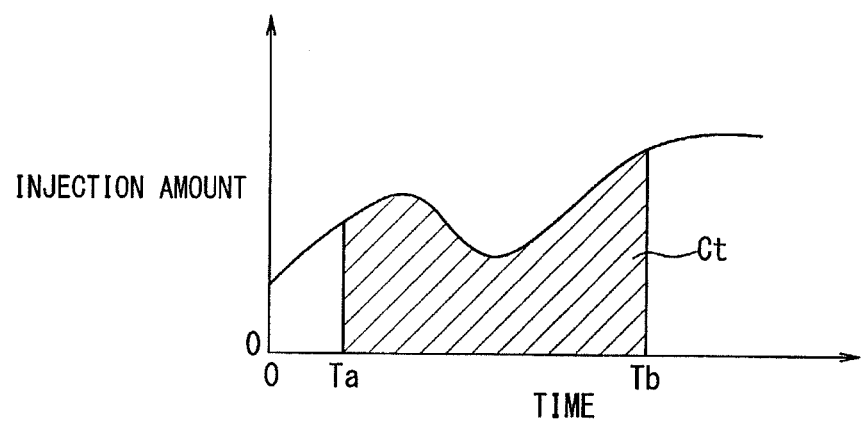
FIG. 4 is a graph showing a total injection amount of the urea water.

As shown in FIG. 3, a remaining amount of the urea water in the tank 14 decreases with time according to the urea-water injection of the injector 20. When the remaining amount decreases from a first standard amount La to a second standard amount Lb, the injection-amount correcting portion 35 uses a difference therebetween as the decreased amount Ld. Ld=La−Lb The injection-amount correcting portion 35 acquires a total amount of the urea water as the total injection amount Ct, during a time period from a time point Ta that the remaining amount becomes the first standard amount La to a time point Tb that the remaining amount becomes the second standard amount Lb. The total injection amount Ct is computed by integrating the injection amount per time unit based on the command value, during a time period where the remaining amount decreases from the first standard amount La to the second standard amount Lb. The injection-amount correcting portion 35 acquires an injection difference E, based on the decreased amount Ld and the total injection amount Ct. The injection difference E represents a relationship between the command value and the injection amount. For example, the injection-amount correcting portion 35 computes the injection difference E by dividing the decreased amount Ld by the total injection amount Ct.

$$E=Ld/Ct$$

The injection-amount correcting portion 35 corrects the command value based on the injection difference E. The injection-amount correcting portion 35 multiplies the command value by a correction value corresponding to a reciprocal number of the injection difference E. Thus, the command value is corrected by the injection-amount difference E.

Figure 5:
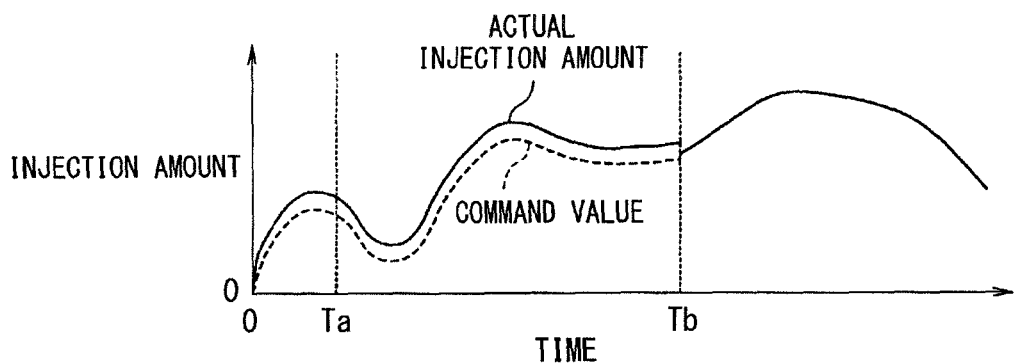
FIG. 5 is a graph showing a relationship between a command value of a control signal, an actual injection amount of the urea water, and time, when an error of the injection amount is generated due to individual differences of the injector, according to the first embodiment.
Figure 6:
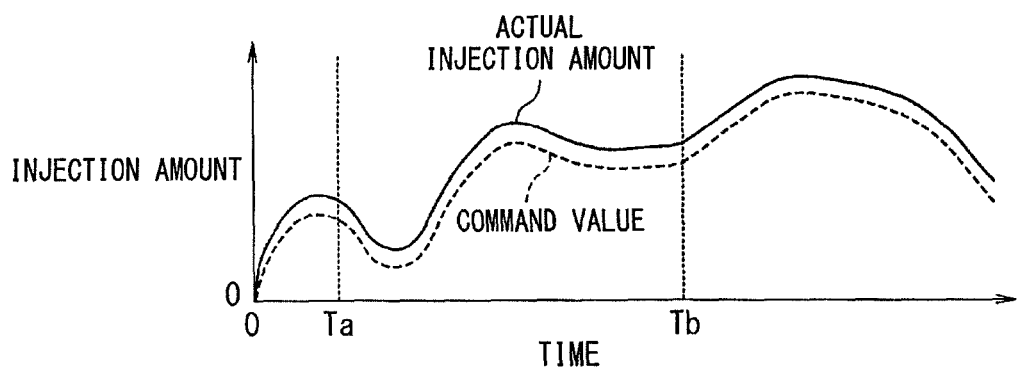
FIG. 6 is a graph showing a relationship between a command value of a control signal, an actual injection amount of the urea water, and time, when an error of the injection amount is generated due to individual differences of the injector, according to a conventional example.

The urea-water is corrected by correcting the command value. According to the first embodiment, as shown in FIG. 5, the injection amount is corrected at the time point Tb that the remaining amount becomes the second standard amount Lb. Therefore, a difference between the command value indicated by a dotted line and an actual injection amount of the urea water indicated by a solid line becomes smaller. Thus, an error of the injection amount generated due to individual differences of the injector 20 can be restricted. In contrast, according to a conventional example, the injection amount is not corrected as shown in FIG. 6. Therefore, the difference between the command value indicated by the dotted line and the actual injection amount of the urea water indicated by the solid line is not fixed.

Figure 7:
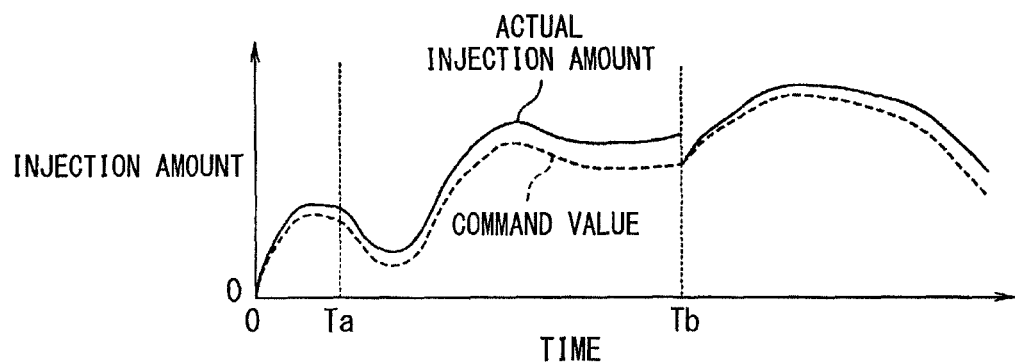
FIG. 7 is a graph showing a relationship between the command value of the control signal, the actual injection amount of the urea water, and time, when an error of the injection amount is generated due to an age-related deterioration, according to the first embodiment.
Figure 8:
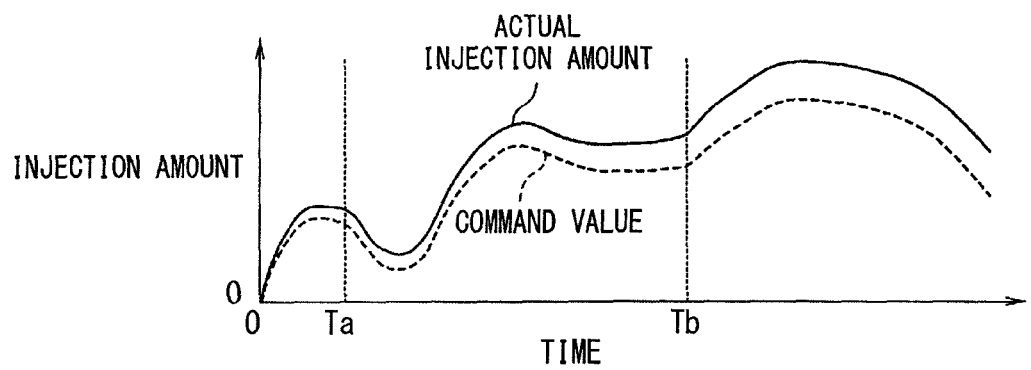
FIG. 8 is a graph showing a relationship between the command value of the control signal, the actual injection amount of the urea water, and time, when an error of the injection amount is generated due to an age-related deterioration, according to another conventional example.

The injection characteristic deteriorates due to aging, even though the same injector 20 is used. According to the first embodiment, as shown in FIG. 7, the injection amount is corrected at the time point Tb that the remaining amount becomes the second standard amount Lb. Therefore, a difference between the command value indicated by a dotted line and an actual injection amount of the urea water indicated by a solid line is canceled every time that the injection amount becomes the second standard amount Lb. Thus, an error of the injection amount generated due to an age-related deterioration can be restricted at a fixed time interval. In contrast, according to the conventional example, the injection amount is not corrected as shown in FIG. 8. Therefore, the difference between the command value indicated by the dotted line and the actual injection amount of the urea water indicated by the solid line gradually becomes greater and greater.

Next, referring to FIG. 9, an operation of the control unit 31 will be described.

Figure 9:
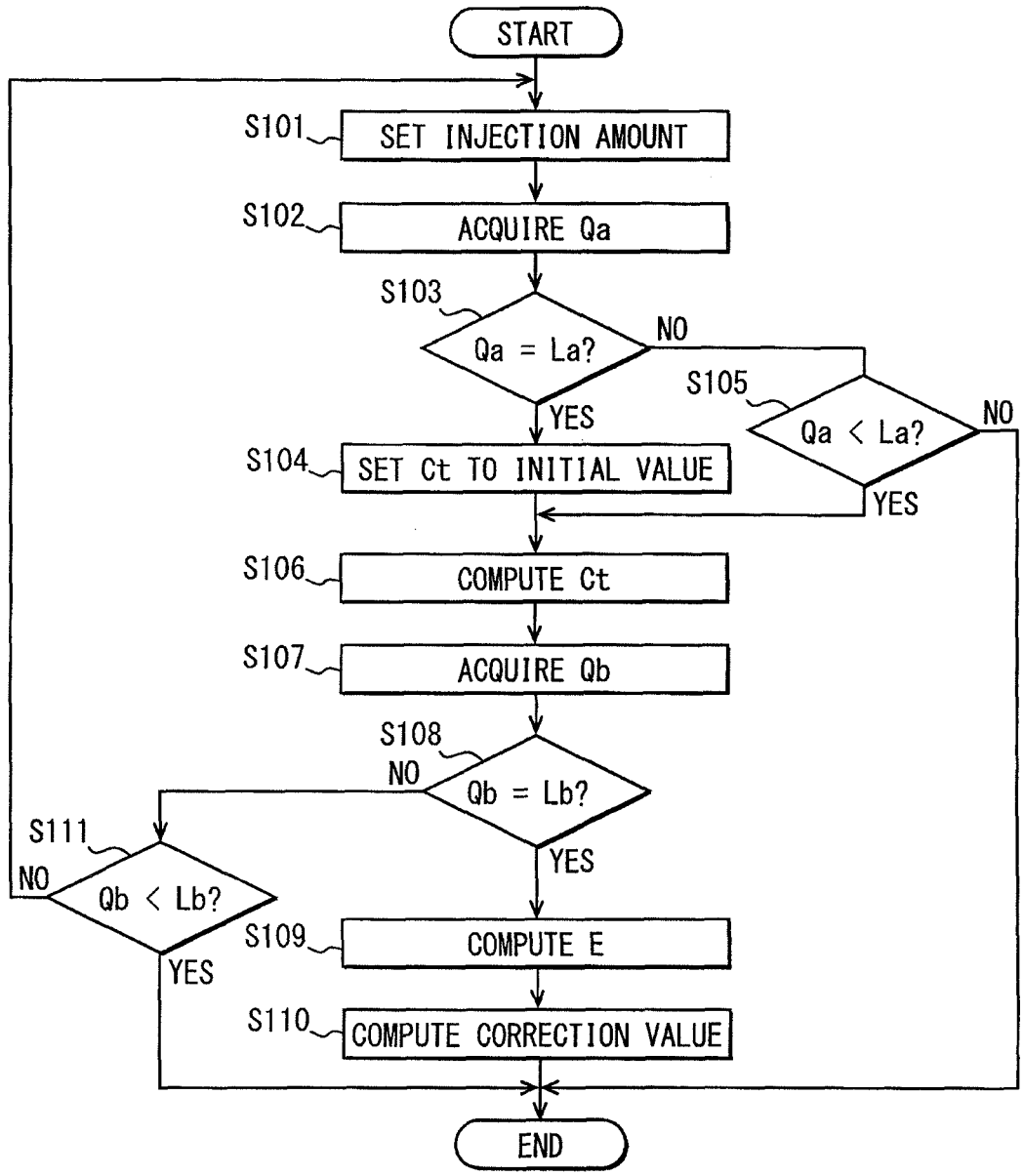
FIG. 9 is a flowchart showing a procedure of the urea-water addition control unit, according to the first embodiment.

When the internal combustion engine 11 is running, the control unit 31 executes a procedure shown in FIG. 9 at a predetermined interval Ts. The predetermined interval Ts is set to 10 ms. At S101, the injector control portion 34 sets the injection amount. The injector control portion 34 computes the injection amount necessary to reduce the NOx based on the amount of the NOx included in the exhaust gas. Then, the injector control portion 34 sets the command value of the control signal outputted to the injector 20, based on the injection amount.

At S102, the injection-amount correcting portion 35 acquires the remaining amount Qa. Specifically, the injection-amount correcting portion 35 acquires the remaining amount Qa from the urea-water sensor 32. The remaining amount Qa may be a ratio of a liquid level relative to a capacity Q of the tank 14, a ratio of the remaining amount relative to the capacity Q, or a cubic volume of the urea water in the tank 14. At S103, the injection-amount correcting portion 35 determines whether the remaining amount. Qa is equal to the first standard amount La. According to the present embodiment, the first standard amount La is set to 80%.

When the injection-amount correcting portion 35 determines that the remaining amount Qa is equal to the first standard amount La (S103: Yes), the injection-amount correcting portion 35 proceeds to S104. At S104, the injection-amount correcting portion 35 sets the total injection amount Ct to an initial value. In this case, the initial value is zero. In other words, the injection-amount correcting portion 35 sets the total injection amount Ct to zero to start correcting the injection amount. The total injection amount Ct is the sum of the injection amounts set by the injector control portion 34. In this case, the total injection amount Ct may be the cubic volume of the urea water, or the command value according to the injection amount. When the injection-amount correcting portion 35 determines that the remaining amount Qa is not equal to the first standard amount La (S103: No), the injection-amount correcting portion 35 proceeds to S105. At S105, the injection-amount correcting portion 35 determines whether the remaining amount Qa is less than the first standard amount La. When the injection-amount correcting portion 35 determines that the remaining amount Qa is greater than the first standard amount La (S105: No), the injection-amount correcting portion 35 terminates the present procedure. Since the first standard amount La is set to 80%, the remaining amount Qa is in a range from 80% of the capacity Q to 100% of the capacity Q. Therefore, the injection-amount correcting portion 35 waits until the remaining amount Qa decreases to the first standard amount La.

When the injection-amount correcting portion 35 determines that the remaining amount Qa is less than the first standard amount La (S105: Yes), the injection-amount correcting portion 35 proceeds to S106. At S106, the injection-amount correcting portion 35 computes the total injection amount Ct. When the total injection amount Ct is set to the initial value at S104, the present procedure is executed at the first cycle. Therefore, at S106, the injection-amount correcting portion 35 sets the total injection amount Ct to the injection amount set at S101. When the injection-amount correcting portion 35 determines that the remaining amount Qa is less than the first standard amount La, the present procedure is executed at the second cycle or later. Therefore, at S106, the injection-amount correcting portion 35 sets the total injection amount Ct by adding the injection amount set at S101 to the total injection amount Ct computed at the previous cycle.

At S107, the injection-amount correcting portion 35 acquires the remaining amount Qb. At S108, the injection-amount correcting portion 35 determines whether the remaining amount Qb is equal to the second standard amount Lb. According to the present embodiment, the second standard amount Lb is set to 20%.

When the injection-amount correcting portion 35 determines that the remaining amount Qb is equal to the second standard amount Lb (S108: Yes), the injection-amount correcting portion 35 proceeds to S109. At S109, the injection-amount correcting portion 35 computes the injection-amount difference E. When the injection-amount correcting portion 35 determines that the remaining amount Qb is equal to the second standard amount Lb, a decreased amount of the urea water in the tank 14 is the decreased amount Ld. The decreased amount Ld is a constant value of the tank 14. The total injection amount Ct varies according to the injector 20. The injection-amount correcting portion 35 computes the injection-amount difference E by dividing the decreased amount Ld by the total injection amount Ct. The injection-amount difference E gradually varies according to the injection characteristic and an age-related deterioration of the same injector 20. The injection-amount correcting portion 35 corrects the command value of the control signal outputted from the injector control portion 34 to the injector 20, according to the injection-amount difference E. Specifically, the injection-amount correcting portion 35 multiplies the command value by a correction value corresponding to a reciprocal number of the injection difference E, to correct the command value.

At S110, the injection-amount correcting portion 35 computes a correction value for correcting the command value. Therefore, the injector control portion 34 drives the injector 20 by using the correction value. Thus, the injection amount can be properly controlled regardless of the injection characteristic or the age-related deterioration.

When the injection-amount correcting portion 35 determines that the remaining amount Qb is not equal to the second standard amount Lb (S108: No), the injection-amount correcting portion 35 proceeds to S111. At S111, the injection-amount correcting portion 35 determines whether the remaining amount Qb is less than the second standard amount Lb. When the injection-amount correcting portion 35 determines that the remaining amount Qb is less than the second standard amount Lb (S111: Yes), the injection-amount correcting portion 35 terminates the present procedure. Since the second standard amount Lb is set to 20%, the remaining amount Qb is from 0% to 20%. Therefore, the injection-amount correcting portion 35 terminates the present procedure. When the injection-amount correcting portion 35 determines that the remaining amount Qb is greater than the second standard amount Lb (S111: Yes), the remaining amount Qb is between the first standard amount La and the second standard amount Lb. Therefore, the injection-amount correcting portion 35 returns to S101, and repeats the present procedure.

According to the first embodiment, the injection-amount correcting portion 35 estimates the injection characteristic by the injection-amount difference E computed based on the total injection amount Ct and the decreased amount Ld. In an ideal condition, the total injection amount is equal to a consumption amount of the urea water in the tank. Therefore, the total injection amount Ct is equal to the decreased amount Ld. However, the injection-amount difference E is generated between the total injection amount Ct and the decreased amount Ld, due to the individual differences or the age-related deterioration of the injector 20. In this case, the injection-amount correcting portion 35 estimates the injection characteristic from the injection-amount difference E, and corrects the command value based on the injection characteristic. Therefore, the injection amount is corrected by considering the individual differences or the age-related deterioration. The injection-amount correcting portion 35 acquires the injection characteristic at an optional time, in a case where the internal combustion engine 11 is running. Therefore, the injection characteristic due to the individual differences or the age-related deterioration is not necessary to be acquired before the injector 20 is mounted to the exhaust purifying system 10, and a manufacturing process for mounting the injector 20 can be simplified. Thus, an accuracy of the injection amount of the urea water added to the exhaust gas can be improved.

Second Embodiment

Figure 10:
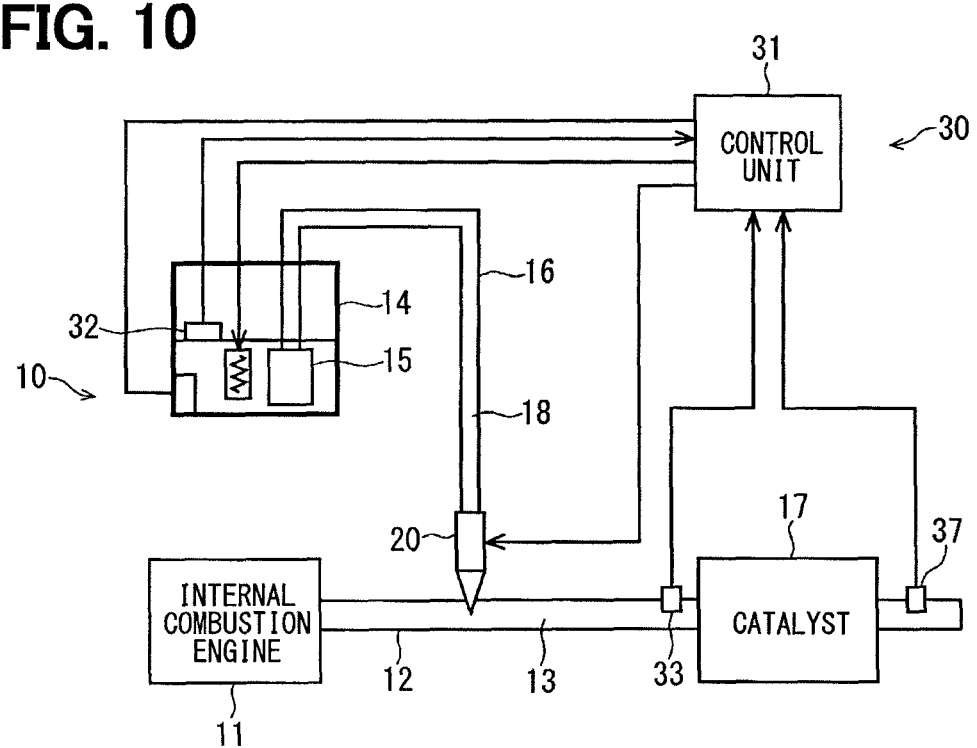
FIG. 10 is a schematic diagram showing the exhaust purifying system according to a second embodiment of the present disclosure.
Figure 11:
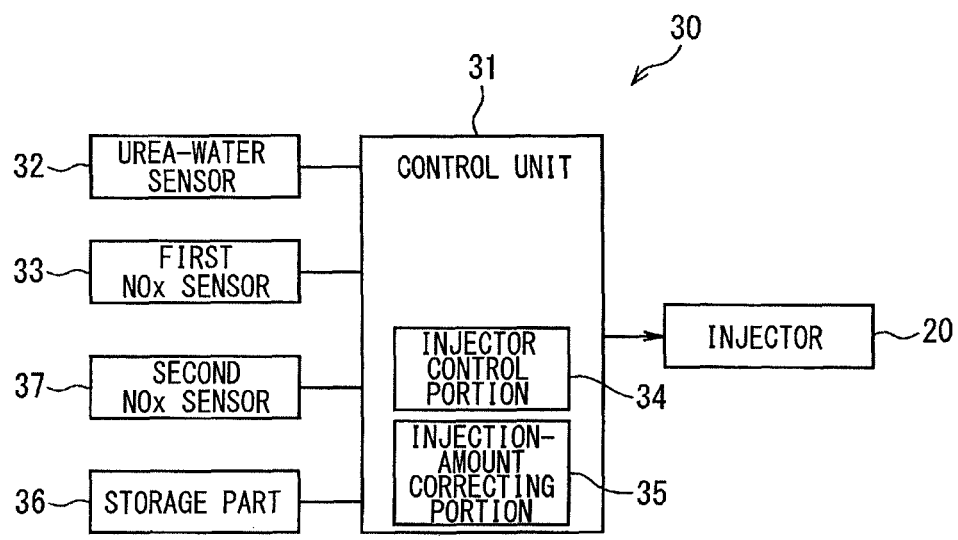
FIG. 11 is a block diagram showing the urea-water addition device according to the second embodiment.

Referring to FIGS. 10 and 11, an exhaust purifying system provided with a urea-water addition device will be described according to a second embodiment.

According to the second embodiment, the urea-water addition device 30 includes a first NOx sensor 33 arranged close to an inlet of the catalyst 17, and a second NOx sensor 37 arranged close to an outlet of the catalyst 17. The second NOx sensor 37 is connected with the control unit 31 and detects the amount of the NOx included in the exhaust gas. In addition, the second NOx sensor 37 may detect a concentration of the NOx included in the exhaust gas.

When the exhaust gas flows through the catalyst 17, the NOx included in the exhaust gas is reduced at the catalyst 17 according to the urea water. When the injection amount of the urea water is suitable for the amount of the NOx included in the exhaust gas, the NOx is hardly included in the exhaust gas that flowed through the catalyst 17. In other words, in this case, the second NOx sensor 37 hardly detects the NOx included in the exhaust gas. When the injection characteristic is sufficiently high, the NOx included in the exhaust gas that flowed through the catalyst 17 is sufficiently decreased without a correction of the injection characteristic.

However, in this case, when a correction of the injection amount is executed based on the decreased amount Ld, the accuracy of the injection amount may be lowered. The injection-amount correcting portion 35 corrects the injection amount, and monitors the amount of the NOx included in the exhaust gas that flowed through the catalyst 17 by using the second NOx sensor 37. When the injection-amount correcting portion 35 determines that a reduction process is insufficient, the injection-amount correcting portion 35 terminates the correction of the injection amount. For example, when the amount of the NOx detected by the second NOx sensor 37 is greater than the amount of the NOx detected by the first NOx sensor 33, the injection-amount correcting portion 35 terminates the correction of the injection amount.

Therefore, even when a detection accuracy of the urea-water sensor 32 is less than an accuracy of the injector 20, an affect of the detection accuracy with respect to the correction of the injection amount is excluded. Thus, the accuracy of the injection amount of the urea water added to the exhaust gas can be improved.

Third and Fourth Embodiment

Figure 12:
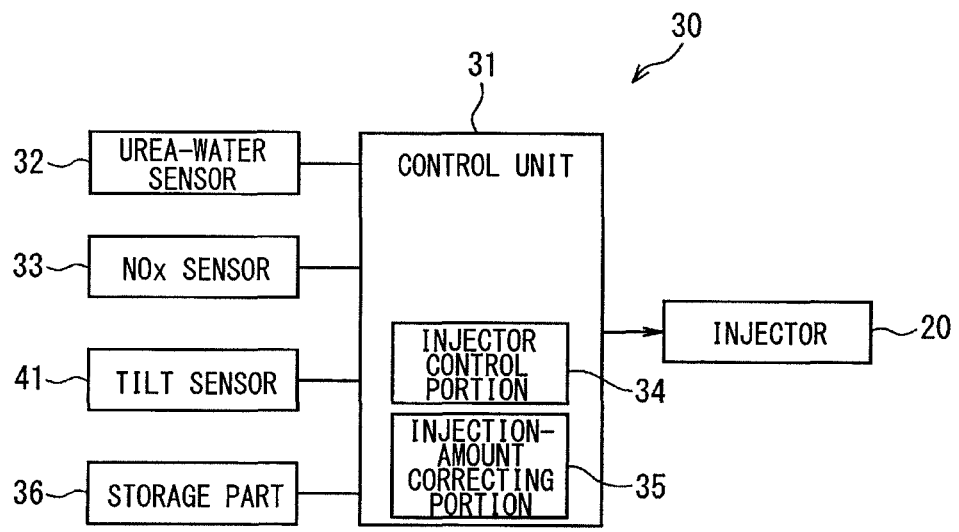
FIG. 12 is a block diagram showing the urea-water addition device according to a third embodiment of the present disclosure.
Figure 13:
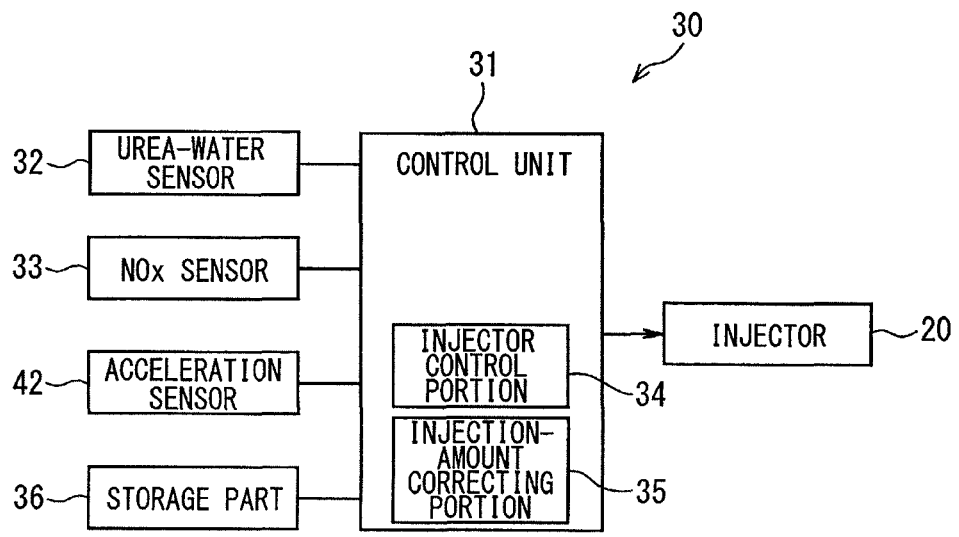
FIG. 13 is a block diagram showing the urea-water addition device according to a fourth embodiment of the present disclosure.

Referring to FIGS. 12 and 13, an exhaust purifying system provided with a urea-water addition device will be described according to third and fourth embodiments.

Referring to FIG. 12, the control unit 31 according to the third embodiment is connected with a tilt sensor 41. The tilt sensor 41 detects a tilt angle of the tank 14 corresponding to a slope relative to a gravity direction, and outputs the tilt angle as an electrical signal to the control unit 31. When the internal combustion engine 11 is mounted to a vehicle, the vehicle is not always traveling or stopping on a flat road. When the vehicle is on a sloping road, the tank 14 is also tilted, and a liquid surface of the urea water accommodated in the tank 14 is also tilted. When the liquid surface is tilted, the first standard amount La and the second standard amount Lb are difficult to accurately be acquired, and an accuracy of the injection-amount difference E is lowered. The control unit 31 acquires the tilt angle of the tank 14 by the tilt sensor 41. The tilt sensor 41 may be provided in the vehicle having the internal combustion engine 11.

According to the third embodiment, when the tilt angle of the tank 14 is greater than an upper-limit angle that is predetermined, the injection-amount correcting portion 35 terminates at least one of an estimation of the injection characteristic, or the correction of the injection amount. Therefore, an affect of the tilt angle can be excluded, and the accuracy of the injection amount of the urea water added to the exhaust gas can be improved. The upper-limit angle can be set to an optional angle in a range that does not affect the estimation of the injection characteristic or the correction of the injection amount.

Referring to FIG. 13, the control unit 31 according to the fourth embodiment is connected with an acceleration sensor 42. The acceleration sensor 42 detects an accelerated velocity applied to the tank 14, and outputs the accelerated velocity as an electrical signal to the control unit 31. When the internal combustion engine 11 is mounted to the vehicle, the accelerated velocity always varies according to an acceleration, a deceleration, or a turning of the vehicle. When an accelerated velocity is applied to the vehicle, the urea water accommodated in the tank 14 starts to shake, and the liquid surface changes. When the liquid surface changes, the first standard amount La and the second standard amount Lb are difficult to accurately be acquired, and the accuracy of the injection-amount difference E is lowered. The control unit 31 acquires the accelerated velocity applied to the tank 14 by the acceleration sensor 42. The acceleration sensor 42 may be provided in the vehicle having the internal combustion engine 11.

According to the fourth embodiment, when the accelerated velocity applied to the tank 14 is greater than an upper-limit velocity that is predetermined, the injection-amount correcting portion 35 terminates at least one of the estimation of the injection characteristic, or the correction of the injection amount. Therefore, an affect of a shaking can be excluded, and the accuracy of the injection amount of the urea water added to the exhaust gas can be improved. The upper-limit angle can be set to an optional angle in a range that does not affect the estimation of the injection characteristic or the correction of the injection amount.

Other Embodiment

The present invention is not limited to the embodiments mentioned above, and can be applied to various embodiments within the spirit and scope of the present invention.

For example, the injection-amount correcting portion may determine to execute the estimation of the injection characteristic or the correction of the injection amount by a combination of the third embodiment with the fourth embodiment. Specifically, the control unit 31 is connected with the tilt sensor 41 and the acceleration sensor 42, and uses the tilt angle and the accelerated velocity to determine to execute the estimation of the injection characteristic or the correction of the injection amount. Further, the above combination may include the second embodiment in addition of the third embodiment and the fourth embodiment.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A urea-water addition device, comprising:
    a urea-water tank containing urea water which is an aqueous solution of urea,
    a urea-water sensor attached to the urea-water tank and detecting an amount of the urea water contained within the urea-water tank,
    a urea-water injector injecting the urea water received from the urea-water tank into an exhaust gas flowing through an exhaust passage, and
    a urea-water addition controller electrically connected to the injector and the urea-water sensor and configured to:
    set an injection amount of the urea water injected from the urea-water injector into the exhaust gas in the exhaust passage, and configured to open or close the urea-water injector based on the injection amount or an adjusted injection amount as defined below,
    receive a signal from the urea-water sensor detecting an amount of urea water remaining in the urea water tank, to estimate an injection characteristic of the urea-water injector based on a difference between a sum of injection amounts and a decreased amount of the urea water remaining in the urea-water tank computed from the signal of the urea-water sensor, and to adjust the injection amount of the urea-water for injection to the adjusted amount of the urea water based on the injection characteristic,
    multiply a command value by a correction value corresponding to a reciprocal number of an injection difference (E), and
    output the command value to the injector to control the injection amount.

2. A urea-water addition device according to claim 1, further comprising:
    a catalyst attached to the exhaust passage, the catalyst promoting a decomposition of nitrogen oxide included in the exhaust gas contained in the exhaust passage,
    a first NOx sensor connected to an inlet of the catalyst, and
    a second NOx sensor connected to an outlet of the catalyst, wherein
    the urea-water addition controller is configured to terminate adjustment of the injection amount when a concentration of the nitrogen oxide detected by the second NOx sensor is greater than a concentration of the nitrogen oxide detected by the first NOx sensor.

3. A urea-water addition device according to claim 1, wherein
    the urea-water addition controller is configured to compute the injection difference (E) by dividing the decreased amount (Ld) by the sum (Ct) of injection amounts.

4. A method for correcting a urea-water mixture injector that varies due to either the age of the urea-water mixture injector or manufacturing imperfections of the urea-water mixture injector, comprising:

setting a urea-water mixture injector amount via a urea-water addition controller;

injecting, via the urea-water addition controller, the urea-water mixture injection amount into an exhaust passage located within an exhaust purification system of a vehicle;

determining the actual volume injected into the exhaust passage by measuring, via a urea-water sensor located in a urea-water tank, a decreased amount of a urea-water volume in a urea-water tank, determining the injection difference of the urea-water mixture injection amount and the decreased volume in the urea-water tank; and correcting, via the urea-water addition controller, the urea-water mixture injector amount by multiplying the urea-water mixture injector amount by the injection difference and by adjusting the urea-water mixture amount, via the urea-water addition controller, accordingly.

5. A method for correcting a urea-water mixture injector that varies due to either the age of the urea-water mixture injector or manufacturing imperfections of the urea-water mixture injector according to claim 4, further comprising detecting an amount of nitrous oxide via a first nitrous oxide sensor connected to the inlet of a catalyst and a second nitrous oxide sensor connected to the outlet of a catalyst, and terminating the correcting of the urea-water mixture injector amount if a first amount detected by the first nitrous oxide sensor is greater than a second amount detected by the second nitrous oxide sensor.

\* \* \* \* \*